Figure 3:
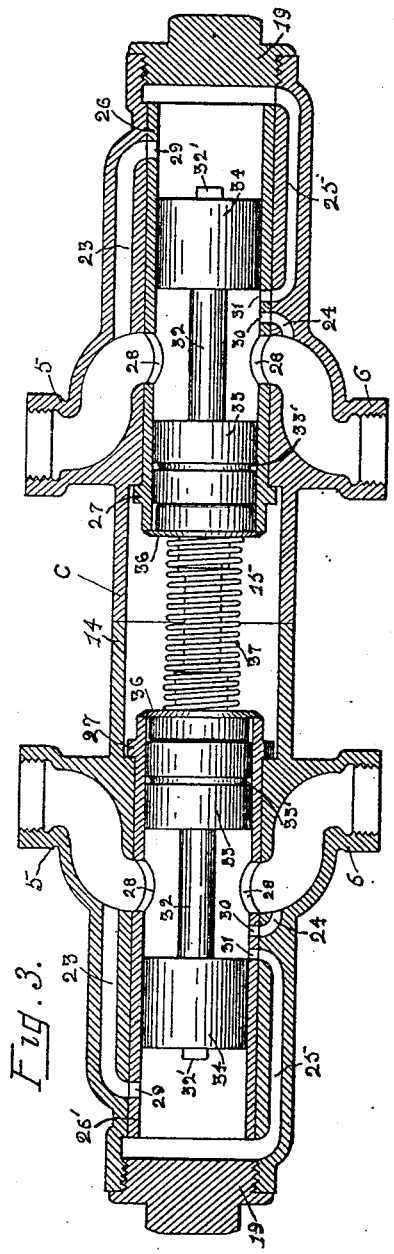

No. 810,863.
PATENTED JAN. 23, 1906.
W. J. HOFSTATTER.
COUPLING SECTION FOR TRAIN AIR PIPES.
APPLICATION FILED JUNE 17, 1905.
3 SHEETS—SHEET 1.
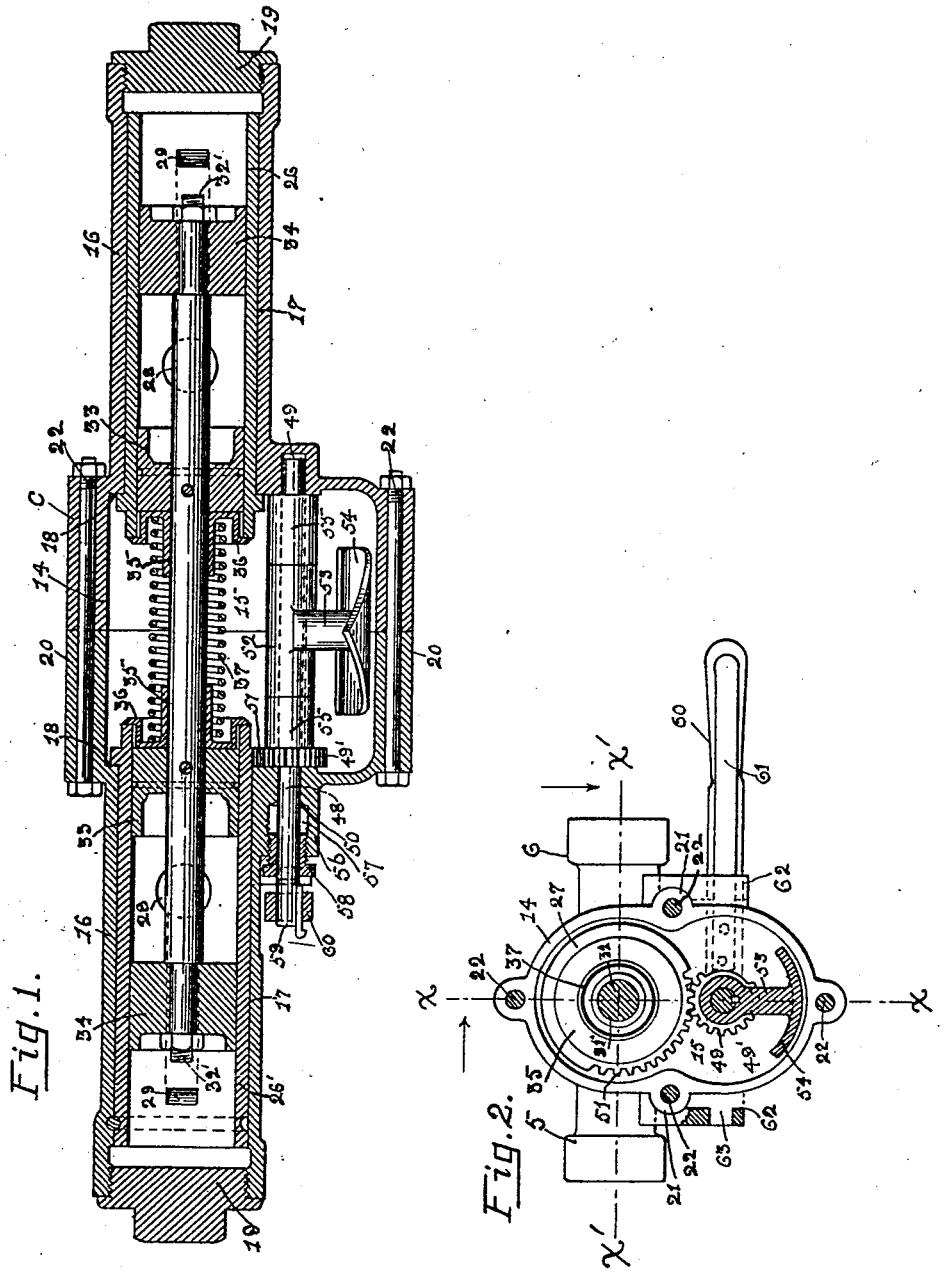
WITNESSES:
D. C. Walter
C. A. D. Young
INVENTOR.
William J. Hofstatter
by Robt. B. Wilson
Attorney No. 810,863. PATENTED JAN. 23, 1906.
W. J. HOFSTATTER.
COUPLING SECTION FOR TRAIN AIR PIPES.
APPLICATION FILED JUNE 17, 1905.

3 SHEETS—SHEET 2.

WITNESSES
D.C. Walter
C.A.D.Young.

INVENTOR.
William J. Hofstatter
by Robt B. Wilson
Attorney

No. 810,863. PATENTED JAN. 23, 1906.
W. J. HOFSTATTER.
COUPLING SECTION FOR TRAIN AIR PIPES.
APPLICATION FILED JUNE 17, 1905.
3 SHEETS—SHEET 3.
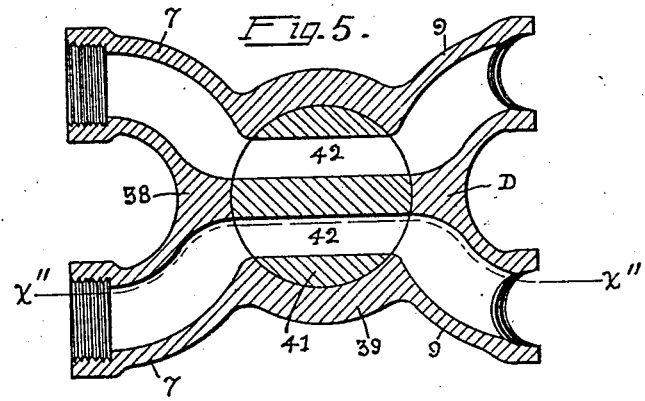
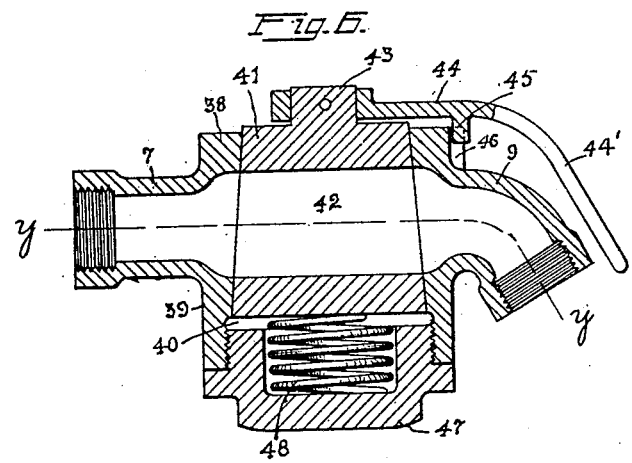
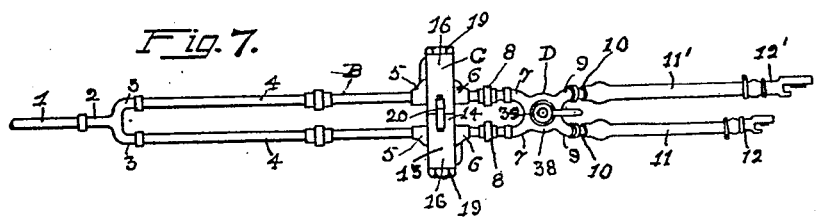
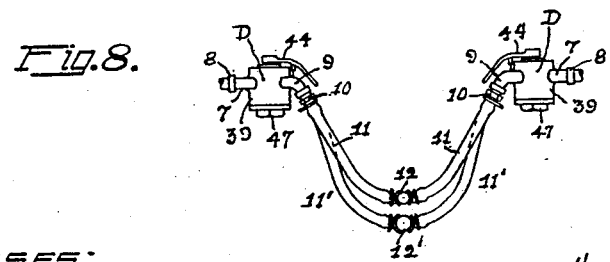
WITNESSES:
C. D. Young.
D. C. Walter
INVENTOR:
William J. Hofstatter
by Robt. B. Wilson
attorney

UNITED STATES PATENT OFFICE.

WILLIAM J. HOFSTATTER, OF TOLEDO, OHIO.

COUPLING-SECTION FOR TRAIN AIR-PIPES.

No. 810,863.     Specification of Letters Patent.     Patented Jan. 23, 1906.

Application filed June 17, 1905. Serial No. 265,697.

*To all whom it may concern:*

Be it known that I, WILLIAM J. HOFSTATTER, a citizen of the United States, residing at Toledo, in the county of Lucas and State of Ohio, have invented a new and useful Improvement in Coupling-Sections for Train Air-Pipes, of which the following is a specification.

My invention relates to a coupling-section for car-sections of the main air-pipe of a train air-brake system.

In a prior application, Serial No. 221,370, I have shown and described a two-way coupling-section provided with a two-way valve at each end, which when the car-sections of the main air-pipe of all the cars of a train are equipped therewith is adapted when a coupling-hose bursts in any one or more of the coupling-sections to close the passage in any coupling-section in which such break occurs and leave the other open and free, whereby the main air-pipe of the train air-brake system is left intact and in condition for either the ordinary service or an emergency application of the brakes of the train and that is provided with coupler-valves that are adapted, if the train breaks in two, so that both of the hose-sections of a two-way coupling-section become uncoupled, to close both passages of such coupling, excepting leaks at the couplers that will operate to produce the equivalent of a "service" application of the brake system.

My present invention is a modification of the said former invention, and has for its object to provide each end of a car-section of the main-line air-pipe with a two-way coupling-section that is adapted when the car is coupled in a train with other cars either similarly equipped or having only the one-way coupling-section commonly used to form with such coupling-sections either a two-way or one-way connection for the main air-pipe, according as the car is coupled to cars having complementary two-way coupling-sections or that are equipped with the now commonly-used one-way coupling-section.

A further object is to provide each end of each car-section of the main air-brake pipe with a coupling-section of the kind which is adapted, first, when coupled with a complementary two-way section of the next adjacent car-section to form a two-way passage from car to car for the air in the main train-pipe that is so controlled by a balanced two-way valve that while the coupling is intact the valve is automatically held open as to both passages of the coupling-section and is unaffected by either a service or "emergency" reduction of air-pressure in the main pipe, but which is adapted, if a break occurs in either or both of the passages either by the bursting of either, or both, of the flexible hose-pipes forming component parts of the coupling-section or by the forcible uncoupling of the coupled hose-pipes by reason of the accidental uncoupling of cars, to close both passages of such coupling-section, excepting a service-leak in one passage on each side of the break, thereby providing for the equivalent of a service application of the train-brake system and preventing what would otherwise be the equivalent of an emergency application of the train-brake system arising from the sudden reduction of the air-pressure in the system, and, second, that is adapted when it is necessary to couple the section to a car-section of the main air-pipe that is equipped with the now commonly-used one-way coupling-section to be readily converted to form with such one-way section a one-way passage between the cars, subject, however, to the same results as are now commonly produced by a break in said one-way coupling-section.

I accomplish these objects by providing each end of a car-section of the main air-pipe of a train air-brake system with a two-way coupling-section having a two-way valve adapted to automatically control the section, said coupling-section and valve being constructed substantially as hereinafter described, and illustrated in the drawings, in which—

Figure 4:
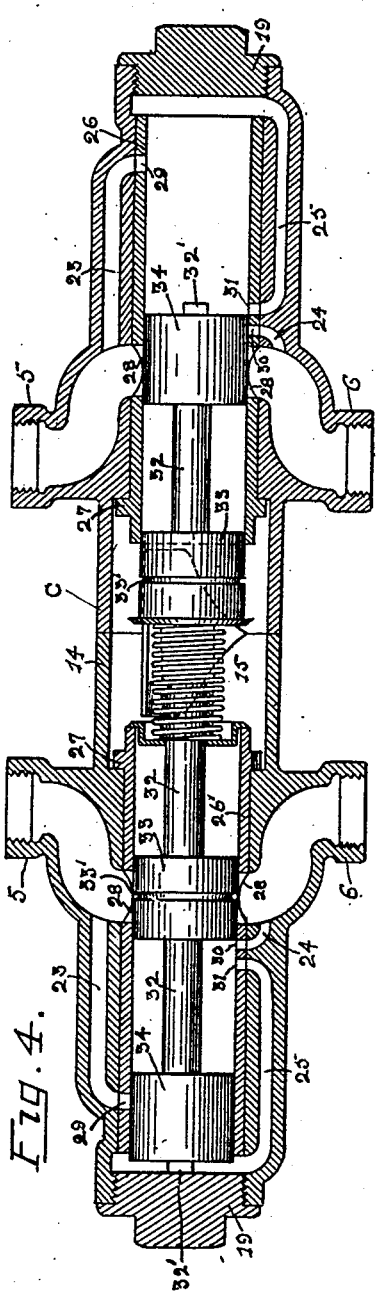

Figure 1 is a view in longitudinal vertical section of the two-way controlling-valve on line X X of Fig. 2 with the valve-pistons in normal position opening all the ports and passages, the stem of the pistons being unsectioned. Fig. 2 is an end elevation of the inner end of one of the half-parts into which the valve is divided with the connecting-bolts, valve-stem, and other parts shown in cross-section. Fig. 3 is a longitudinal horizontal section of the two-way valve with the valve pistons, stem, spring, and other working parts shown unsectioned in their normal positions when all the ports and passages are "open." Fig. 4 is a similar view showing the valve-pistons in position closing both of the main passages and some of the by-passes. Fig. 5 is a section of the two-way angle-cock on line Y Y of Fig. 6. Fig. 6 is a vertical section of the angle-cock on line X″ X″ of Fig. 5. Fig. 7 is a plan view of my coupling-section complete, showing the relative lengths of the long and short hose-pipes. Fig. 8 is a side elevation of the angle-cocks of two coupled two-way sections, illustrating the relative elevation of the couplers of the long and short hose when coupled.

In the drawings, 1 represents a broken-away end portion of a car-section of the main-line air-pipe of a train air-brake system; B, a two-way coupling-section for the car-section coupled thereto and comprising a Y, having the stem 2 and the branches 3, the pipe extensions 4 of the branches 3, the two-way valve C, having the branches 5 connected to the extension-pipes 4, and the oppositely-projecting branches 6, the two-way angle-cock D, having the branches 7 connected to the branches 6 by the couplings 8, and the oppositely-projecting and downwardly-curved branches 9, provided with the hose-nipples 10 and the flexible hose 11 and 11′, respectively connected at their inner ends to the nipples 10 and respectively provided at their outer ends with couplers 12 and 12′.

The casing 13 of the valve C comprises the enlarged bi-cylindrical central portion 14, forming the bi-cylindrical chamber 15, and the cylinders 16, extending opposite from the ends of the central chamber, the cylinders 16 having bores 17 of reduced diameter in axial alinement with the axis of the upper portion of the chamber 15 and forming annular shoulders 18 around the inner ends of the bores 17. At their outer ends the cylinders 16 are interiorly threaded to receive the threaded closure-plugs 19. The central portion 14 is provided with the exterior bosses 20, extending longitudinal thereof above and below the central portion, and with the exterior bosses 21 on opposite sides along the lines of intersection of the upper and lower portions of the central portion 14, and these bosses are provided with longitudinal bores to receive the bolts 22. The casing 13 is cross-sectionally divided central of its length through the central portion 14, and the halves thus formed are secured firmly and closely together by the bolts 22. On one side the casing 13 is provided with the integral pipe branches 5, located at equal distances from the division of the casing, one to each half-section, and opposite thereto are the pipe branches 6. The bores of the branches are each curved outward through suitably-thickened portions of the walls of the cylinders 16 to opposite intersection with the bores 17 of the cylinders 16, the centers of the intersections of the branches 5 being opposite the centers of intersection of the branches 6, the openings formed by the intersection of the branches being all located in the inner halves of the extension-cylinders 16. From the bore of each branch 5 extends outward longitudinally through the walls of the cylinders 16, suitably-thickened therefor, a by-pass 23, which near the outer end of the cylinder is curved into intersection with the bore 17 of the cylinder, and from the bore of each branch 6 extends outwardly in the cylinder-wall by a short curve the by-pass 24, which intersects the bore 17 near the intersection of the bore of the branch 6 with the bore 17. The cylinders 16 are also each provided with a by-pass 25, extending longitudinally through the wall of the cylinder in line with the by-pass 24, which is curved at its inner end into intersection with the bore 17 outside of and adjacent to the intersection of the by-pass 24, and its outer end is again curved into intersection with the bore adjacent to the end plug 19 of the cylinder. The cylinders 16 are respectively provided with the inner cylinders 26 and 26′ of equal length and bore-diameter, the cylinder 26 closely fitting and the cylinder 26′ revolubly fitting the bores of their respective cylinders 16, and each of these inner cylinders is provided with an outer concentric flange 27 near its inner end, which shoulders against the shoulder 18 of its outer cylinder, and with ports 28, 29, 30, and 31, the ports 28 registering with the intersections of the branches 5 and 6, the ports 29 with the by-passes 23, the ports 30 with the by-passes 24, and the ports 31 with the inner intersections of the by-passes 25, the outer intersection of the by-passes 25 with the bores 17 of the cylinders 16 being beyond the outer ends of the inner cylinders 26 and 26′. The free ends of the branches 5 and 6 are interiorly threaded for coupling, respectively, to the extensions 4 of the Y 1 and the branches 7 of the angle-cock D by the couplings 8.

Within the bores of the cylinders 26 and 26′ are mounted on a common stem 32 of suitable length the pairs of inner pistons 33 and outer pistons 34, each piston of each pair being of a length and diameter adapted to close the opposite ports 28 of their respective cylinders. Each cylinder has one piston of each pair, and the pistons of each cylinder are so located on the stem relative to each other and to the pistons of the other cylinder and to the ports that when the outer piston of one cylinder is in position closing the ports 28 and 30 of its cylinder and leaving its ports 29 and 31 open the inner piston of the other cylinder is in position closing the ports 28, and its outer piston is in position closing the port 29 of such other cylinder, while both the ports 30 and 31 opposite the by-passes 24 and 25 are open, as shown in Fig. 4. The inner pistons 33 are each provided central of their length with a circumferential groove 33′, which when either of the inner pistons is moved into position closing the ports 28, as aforesaid, the groove 33' forms a leak-passage for air through the ports 28. The stem 32 has end portions 32' extending beyond the outer ends of the pistons 34, which operate as stops to limit the reciprocal movement of the pistons. On the stem 32 of the pistons between the inner pistons and within the central chamber 15 are movably mounted by axial sleeves 35 disks 36, which in diameter equal the diameter of the inner ends of the cylinders 26 and 26'. The central portions of the disks are preferably cupped to enter the ends of the cylinders and to receive therein the ends of a helical spring 37, which is mounted on the sleeves 35 between the disks. The spring 37 normally holds the disks 36 respectively shouldered against the ends of the cylinders 26 and 26', in which position the inner ends of inner pistons 33 are in engagement with the disks, and both the inner and outer pistons are in position uncovering all of the ports of the two cylinders, as shown in Fig. 1, whereby free passage of air from branch to branch is provided both through the ports 28 between the inner and outer pistons and through the by-passes 23, 24, and 25 around the outer ends of the outer pistons.

The angle-cock D comprises the casing 38, having the central body portion 39 provided with a longitudinal bore 40, which for a portion of its length is cylindrical and interiorly threaded and for the remaining part of its length is tapered, and with the branch pipes 7 projecting transversely to the bore in opposite curves from one side and the oppositely and downwardly curved branch pipes 9 from the other side, the bores of the branch pipes 7 intersecting the tapered portion of the bore 40, one opposite to the intersection therewith of each branch pipe 9, the tapered valve-plug 41 rotatably fitting the tapered portion of the bore 40 and having parallel transverse ports 42, each adapted to register in line with and connect the bores of each pair of opposite branches 7 and 9, as shown in Fig. 5, and when so registered to form two separate passages through the branches and the valve-plug, the plug being also provided with a stem 43 at its reduced end, upon which is mounted the valve-lever 44, having its handle portion 44' curved downward over the branches 9 and provided with a stop-lug 45, adapted to engage a stop-lug 46 on the casing when the ports of the plug are in register with the branches, the end plug 47 being threaded into the cylindrical portion of the bore 40 and the helical spring 48 interposed between the valve-plug and the end plug. The free ends of the curved branches 9 are provided with the hose-nipples 10, to which are respectively coupled the flexible hose-sections 11 and 11' of unequal length, the outer ends of which are respectively provided with the couplers 12 and 12', which are of the form ordinarily employed, excepting that coupler 12 is smaller in size, for reasons hereinafter set forth.

Each end of each car-section of the main air-brake pipe of a train of cars being equipped with a coupling-section B constructed as described and adjacent sections B being coupled together by coupling the short hose-couplers 12 together and the long hose-couplers 12' together, as shown in Fig. 8, the coupling-sections B will provide the main air-pipe with a two-way passage for the air between each car. Before the admission of air to the train-pipe the springs 37 of the several valves C will hold the pistons of the valves normally open as to all of the ports of the valves, and as the air is pumped into the train-pipe the pressure will be equal in each passage of each coupling and on the outer ends of the outer pistons of the valves C, which being of equal area the pistons will remain in their normal open position as held by the spring 37 so long as the couplings remain intact and will be unaffected by either a service or emergency reduction of pressure in the train-pipe. If, however, either one of the hose-pipes of any one of the couplings B of the train-pipe should burst, an immediate reduction of pressure in the passage of which such hose forms a part would ensue, whereby the pressure being greater in the opposite passage the pistons of the valve C of the coupling-section in which the break occurs and of its complementary section B will be instantaneously moved to the limits of their possible movement in the direction of the passage in which the break has occurred, thereby closing the ports 28 of the broken passage by the inner pistons of the valves adjacent thereto, excepting the leakage through the annular grooves 33' and the ports 28 of the other passage by the adjacent outer piston. This movement, as shown in Fig. 4, will also close the ports 29 of the broken passage and open the ports 29 of the other passage. It will also open the ports 30 and 31 of the broken passage and close the ports 30 of the other. The effect of this movement, as will readily appear, is to maintain a preponderance of pressure on the end piston, closing the ports 28 of the unbroken passage by reason of access of pressure from the main pipe from opposite sides of the break through the by-pass 23 and the port 29 adjacent to that piston, and the reduction of pressure on the outer end of the other end piston by the escape of air through the by-pass 25, the ports 30 and 31, and the by-pass 24, into the broken passage. At the same time the leak-grooves 33' of the inner pistons closing the ports 28 of the broken passage permits the escape of air from the main train-pipe from both sides of the break, which causes a reduction of pressure therein, which is the equivalent of a service-reduction by the engineer's valve, thereby producing the equivalent of the ordinary service application of the brakes of the train used to bring the trains to a gradual stop and warning the engineer of the train that a break has occurred. When the train has stopped to repair the break, the angle-cocks D adjacent to the break are both closed, the effect of which is to retain the air escaping through the leak-grooves 33' in the branch pipes 6 of the broken passage, whereby air is forced through the by-passes 24 and 25 and the open ports 30 and 31 until the pressure at the outer ends of both end pistons again becomes equal, under which condition the springs 37, which have been compressed by the closing movement produced by the break, automatically return their respective pistons to their normal position, as shown in Fig. 3, so that when the break is repaired and the angle-cocks are again opened the valves are open to admit air simultaneously to both passages of the repaired section.

When a train equipped with my coupling-section breaks in two, whereby the couplers 12 and 12' are forcibly separated, the couplers 12, attached to the shorter hose 11, are separated before the couplers 12', attached to the longer hose 11'. This precedence in separation causes a precedent reduction of pressure in the shorter passage, to which both valves C instantly respond by a movement of their respective pistons toward the shorter passage, thereby closing both passages of the separated sections B, as shown in Fig. 4, excepting a service-leak from the train-pipe from opposite sides of the break through the short hose-pipes 11, which will have the effect to set the brakes gradually on both sections of the train and bringing both to a gradual stop, thereby preventing the sudden reduction of pressure in the train air-pipe and the sudden and violent application of the brakes, which follows as a necessary consequence upon the happening of a similar uncoupling of the coupling-sections, now commonly and generally used, and often producing disastrous wrecks. Otherwise than that, in the accidental uncoupling of both couplers of coupled sections B the closure of the valves C is always in the direction of the shorter passage of the sections the operation of the valves is always the same, and in this also they follow the law of their operation, which is to move in the direction of least pressure and thereafter maintain the closure as long as the break, from whatever cause produced, remains unrepaired or until an equilibrium of pressure has been restored by closing the angle-cocks D of the disrupted sections B, as before described. By using hose-pipes of increased length for one passage of the sections B the earlier separation of the couplers of the shorter passage, in the event of forcible uncoupling due to the accidental uncoupling of cars, is assured and the operation of the valves is made certain, and in order that the mistake may not be made of coupling a long hose to a short hose the couplers of the short-hose pipes are preferably not complementary to the couplers of the long hose. It is obvious that by reason of the one-way car-sections of the train air-pipe intervening between the two-way coupling-sections B, a break occurring in any one, or both, of two coupled sections will in no way disturb or affect the valves C of any other coupled sections B in other parts of the line adjacent or remote, and it is further obvious that, by the difference in hose lengths, in the event of the simultaneous bursting of both a long and short hose of two coupled sections B the valves C will operate to close both passages, since it is not possible that such breaks should occur at equal distances from each valve, and this difference in distance will cause a difference in pressure that will operate each valve in the direction of least pressure as to that valve, the result attained being the same whether the valves are operated in the same or in opposite directions. It is therefore manifest that by employing coupling-sections constructed in accordance with my invention any accidental disruption of either one or both of two coupled sections forming a connection between two car-sections of the main train air-pipe will cause a gradual setting of the brakes of the entire train system, which will produce a gradual stopping of the train, such as may be effected by the engineer's valve, and that their use will prevent the disastrous results caused by disruption of the commonly-used one-way coupling-section by reason of the sudden and unexpected reduction of pressure in the brake system, and this without interfering, so long as the system is intact, with an emergency application of the brakes whenever circumstances require it. Recognizing, however, that it is not possible that all cars shall be at once equipped with such couplings and that by reason thereof it will be sometimes necessary for cars that are so equipped to be coupled to cars that are equipped with one-way couplings, I have so constructed my valves C that they may be readily adjusted to close one passage of the coupling and leave the other open and in like condition as in the one-way coupling-sections and adapted to be coupled up therewith. To so adapt my coupling-section, the valve C is provided with an arbor 48, which is suitably journaled in the alined bores 49 and 50 in the end walls of the lower portion of the bicylindrical central portion 14 of the valve-casing axial thereto and parallel with the stem 32 of the pistons, and on the portion of the arbor extending through the lower portion of the chamber 15 there is fixedly mounted the pinion-gear 49' in position to intermesh with cogs 51, formed on the flange 27 of the inner cylinder 26', as shown in Fig. 2. The diameter of the pinion is so proportioned to the diameter of the flange 27 that a half-revolution of the pinion causes a part revolution of the cylinder 26' sufficient to carry all the ports of the cylinder out of register with the bores of the branches 5 and 6 and the by-passes 23, 24, and 25 of its outer cylinder 16, thereby completely closing one passage of the coupling-section. Central of the arbor within the chamber 15 there is also concentrically mounted thereon a wheel-segment comprising the hub 52, which is keyed to the arbor, a spoke 53, and a triangular rim-segment 54, concentric to the hub and centrally attached to the outer end of the spoke. Two sides of the rim-segment are equal cam-curves intersecting at a circumferential line drawn central of the rim, and the third side is by said central line bisected centrally of its length, the length of the third side being equal to the distance between the disks 37, mounted on the stem 32 when both disks are engaged with the inner ends of the cylinders 26 and 26'. The radius of the spoke 53 is adapted in a half-revolution of the arbor to bring the rim-segment between the disks 37 in position to wedge them against their respective cylinders, thereby locking the pistons in their normal open position at the same time that the cylinder 26' is turned to a position closing its ports and cutting off all connection between the branches and by-passes of its cylinder 16. There is also mounted on the arbor between the hub 50 and the gear 49' on the one side and between the hub and the wall of the casing on the other side sleeves 55, which, together with the gear and the hub, prevent any lengthwise shifting of the arbor which would carry the cam 54 out of its central position.

The wall of the cylinder 16, in which is housed the inner cylinder 26', is provided with a thickened portion 56, through which is a counterbored extension 57 of the bore 50, and the counterbore is interiorly threaded to receive a packing-sleeve nut 58, through which an outer end portion 59 of the arbor 48 extends and has mounted thereon a lever 60 for rotating the arbor. The lever 60 is provided with a spring-latch 61, which is secured thereto at one end near the arbor and extends along the lever, the outer end portion being flexed outward therefrom a short distance. The branches 5 and 6 of said cylinder 16 are each provided with a pendent lug 62, the outer ends of which extend parallel with and adjacent to the plane of the inner face of the lever 60, and in the end of each lug is provided a notch 63, into which the latch 61 springs as the lever is moved past the end of the lug, thereby locking the lever to the lug. The valve C of each two-way coupling-section being thus equipped, when it is necessary to couple a section with the commonly-used one-way section the spring of the lever 60 is released and the lever is moved from its position as shown in Fig. 2 downward and upward in a half-revolution to the left until the latch 61 springs into engagement with the notch 63 of the opposite lug 62, by which movement the cylinder 26' is turned until all the ports of that cylinder are out of register with the branches and by-passes of the cylinder 16, in which it is housed, and the passage extending through it is closed and the cam-segment 54 is also moved a half-revolution, which brings it between the disks 36, thereby locking the pistons in their normal open position, in which position the other passage of the section which extends through the ports of cylinder 26 is established open. The long hose 11', forming a part of the passage, being provided with the standard couplers 12', used on the one-way coupling-section, connection may be made therewith, whereby an open one-way passage from car to car in all respects under similar control is established.

The spring 37 of the valve C is reduced to the lowest resistance capacity that is sufficient to certainly overcome the friction and inertia of the pistons under an equilibrium of pressure; but by increasing the length of the connecting-pipes 4 a spring 37, having a proportionately higher resistance, may be employed if the frictional resistance of the pistons so requires, as such increased length of the pipes 4 proportionately increases the difference in pressure in the two passages when a break occurs in one, and the valve will operate to close both passages whenever there is such preponderance of pressure in one passage over the pressure in the other as will overcome the resistance of the spring plus the frictional resistance and inertia of the pistons. The sensitiveness of the valve to difference of pressure may be increased by accuracy of fitting and smoothness of finish of cylinders and pistons.

The valves C are identical in parts and construction, but are made "rights" and "lefts" in order that the valves of companion sections shall be in the same relation to the hose-pipes and the car-sections.

What I claim to be new is—

1. In a train air-brake pipe the combination substantially as set forth of a two-way passage extending a one-way passage, a valve-passage extending a one-way passage, a valve-casing having lateral transverse branches coupled respectively in line with the two-way passage, and a valve-chamber transverse both passages, said two-way passage having as component parts thereof, a hose-pipe for each passage, provided with a coupler, a two-way closure-valve in the valve-chamber, having opposed equal pressure areas, and adapted to close both passages, excepting a leak in one passage, by the movement of the valve in either of opposite directions, a spring adapted to yieldingly hold the valve in position normally opening both passages under equal pressures in the passages, and adapted to yield to permit movement of the valve in the direction of either passage having the pressure therein reduced below the pressure in the other passage by escape of air from its hose-pipe.

2. In a train air-brake pipe the combination substantially as set forth of a two-way passage extending a one-way passage, a valve-casing having lateral transverse branches coupled respectively in line with the two-way passage, and a valve-chamber transverse both passages, said two-way passages having as component parts thereof, a hose-pipe for each passage, provided with a coupler, a two-way closure-valve in the valve-chamber, having opposed equal end pressure areas, and adapted to close both passages, excepting a leak in one passage, by the movement of the valve in either of opposite directions, a spring adapted to yieldingly hold the valve in position normally opening both passages under equal pressures in the passages, and adapted to yield to permit movement of the valve in the direction of either passage having the pressure therein reduced below the pressure in the other passage by escape of air from its hose-pipe, means to automatically maintain a closure of the valve so long as air escapes to the atmosphere through the hose by maintaining a preponderance of pressure on one end of the valve, and means to equalize the pressure on the valve ends and permit its return to normal open position whenever air ceases to escape from the hose.

3. In a coupling-section for car-sections of a train air-brake pipe, the combination substantially as set forth of a Y coupled to one end of a car-section, two equal lengths of pipe extending the Y branches, two unequal lengths of hose-pipe extending respectively in line with the extensions of the Y branches, a valve-casing having transverse lateral branches coupled into line respectively with and between the hose-pipes and the extensions, and a valve-chamber transverse the lines of the branches, couplers for the free ends of the hose-pipes, adapted to be coupled to a complementary duplicate coupling-section similarly extending an adjacent car-section, a two-way closure-valve in the valve-casing having opposed equal pressure areas and adapted to close both passages formed by the Y branches, their extensions, the valve-casing, and the hose-pipes, excepting a leak in one passage, by the movement of the valve in either of opposite directions, a spring adapted to yieldingly hold the valve in position normally opening both passages under equal pressures in the passages, and adapted to yield to permit movement of the valve in the direction of either passage having the pressure therein reduced below the pressure in the other passage, by escape of air from its hose-pipe.

4. In a coupling-section for car-sections of a train air-brake pipe, the combination substantially as set forth of a Y coupled to one end of a car-section, two equal lengths of pipe extending the Y branches, two unequal lengths of hose-pipe extending respectively in line with the extensions of the Y branches, a valve-casing having transverse lateral branches coupled into line respectively with and between the hose-pipes and the extensions, and a valve-chamber transverse the lines of the branches, couplers for the free ends of the hose-pipes, adapted to be coupled to a complementary duplicate coupling-section similarly extending an adjacent car-section, a two-way closure-valve in the valve-casing having opposed equal end pressure areas and adapted to close both passages formed by the Y branches, their extensions, the valve-casing, and the hose-pipes, excepting a leak in one passage, by the movement of the valve in either of opposite directions, a spring adapted to yieldingly hold the valve in position normally opening both passages under equal pressures in the passages, and adapted to yield to permit movement of the valve in the direction of either passage having the pressure therein reduced below the pressure in the other passage by escape of air from its hose-pipe, means to automatically maintain a closure of the valve so long as air escapes to the atmosphere through the hose by maintaining a preponderance of pressure on one end of the valve, and means to equalize the pressure on the valve ends and permit the valve to return to normal open position whenever air ceases to escape from the hose.

5. In a coupling-section for car-sections of a train air-brake pipe, the combination substantially as set forth, of a Y coupled to one end of the car-section, two equal lengths of pipes extending the Y branches, a valve-casing having transverse lateral branch pipes coupled into line respectively with the pipe extensions of the Y branches, and a valve-chamber transverse the lateral branches, a two-way angle-cock having transverse branch pipes coupled into line respectively with the transverse branches of the valve-casing, hose-pipes of unequal length extending the branches of the angle-cock and provided with couplers at their outer ends, the whole constituting a two-way passage extending the one-way passage of a car-section of the main air-pipe, a two-way closure-valve in the valve-casing having opposite equal end pressure areas and adapted to close both passages, excepting a leak in one, by movement of the valve in either of opposite directions, a spring adapted to yieldingly hold the valve in position normally opening both passages under equal pressures in the passages, and yielding to permit movement of the valve in the direction of either passage having the pressure therein reduced below the pressure in the other passage, by escape of air from its hose-pipe.

6. In a coupling-section for car-sections of a train air-brake pipe, the combination substantially as set forth, of a Y coupled to one end of the car-section, two equal lengths of pipes extending the Y branches, a valve-casing having transverse lateral branch pipes coupled into line respectively with the pipe extensions of the Y branches, and a valve-chamber transverse the lateral branches, a two-way angle-cock having transverse lateral branch pipes coupled into line respectively with the transverse branches of the valve-casing, hose-pipes of unequal length extending the branches of the angle-cock and provided with couplers at their outer ends, the whole constituting a two-way passage extending the one-way passage of a car-section of the main air-pipe, a two-way closure-valve in the valve-casing having opposite equal end pressure areas and adapted to close both passages excepting a leak in one, by movement of the valve in either of opposite directions, a spring adapted to yieldingly hold the valve in position normally opening both passages under equal pressures in the passages, and yielding to permit movement of the valve in the direction of either passage having the pressure therein reduced below the pressure in the other passage, by escape of air from its hose-pipe, means to automatically maintain a closure of the valve so long as air escapes to the atmosphere through the hose by maintaining a preponderance of pressure on one end of the valve, and means to equalize the pressure on the valve ends and permit its return to normal open position whenever air ceases to escape from the hose.

7. In a pressure-conduit the combination with a two-way passage extending and connecting a one-way passage, of a valve-casing having lateral transverse branches forming portions of each passage, and having a valve-chamber extending transverse the two passages, a reciprocating valve in the chamber, having equal end pressure areas, and adapted to close both passages by a movement of the valve in either direction of its reciprocation, a spring adapted to yieldingly hold the valve in position normally opening both passages under equal pressures in the passages, and adapted to yield to permit movement of the valve to close both passages under unequal pressures in the passages, means to automatically maintain the closure while the pressures in the passages on opposite sides of the valve are unequal, and to return the valve to its normal position opening both passages when an equilibrium of pressure is restored in the passages on opposite sides of the valve, and means to restore such equilibrium.

8. In a brake apparatus, the combination substantially as set forth of two adjacent car-sections of a train car-brake pipes each having coupled thereto a two-way coupling-section comprising a Y, pipes equally extending the branches of the Y, hose-pipes provided with complementary couplers unequally extending the pipes of the Y branches and a valve mechanism, interposed between and connecting the hose-pipes and the pipes extending the branches of the Y, constructed and operating as set forth.

9. The combination substantially as set forth of two or more consecutive car-sections of the main car-pipe of a train-brake system, each provided at each end with a two-way coupling-section comprising a Y, pipes equally extending the branches of the Y, a valve mechanism constructed and operating as set forth controlling the pipe extensions of the Y, and hose-pipes of unequal length, provided with complementary couplers uniting the adjacent valve mechanisms.

10. The combination in a two-way coupling-section for car-sections of a train air-pipe, of two lines of pipe having a common one-way connection at one end and separate hose-terminals provided with couplers at the other end and intervening valve mechanism as set forth adapted to control both lines of pipes, said valve mechanism being provided with means to close one pipe and lock the valve in position opening the other pipe, whereby the section is made adaptable to connect with and operate as a one-way coupling-section, substantially as set forth.

In witness whereof I have hereunto signed my name, in the presence of two subscribing witnesses, this 13th day of June, 1905.

WILLIAM J. HOFSTATTER.

Witnesses:
WM. LOCK,
WALTER A. EVERSMAN.